(No Model.) 2 Sheets—Sheet 1.
H. L. F. TREBERT.
SPEED MECHANISM FOR BICYCLES.
No. 462,782. Patented Nov. 10, 1891.
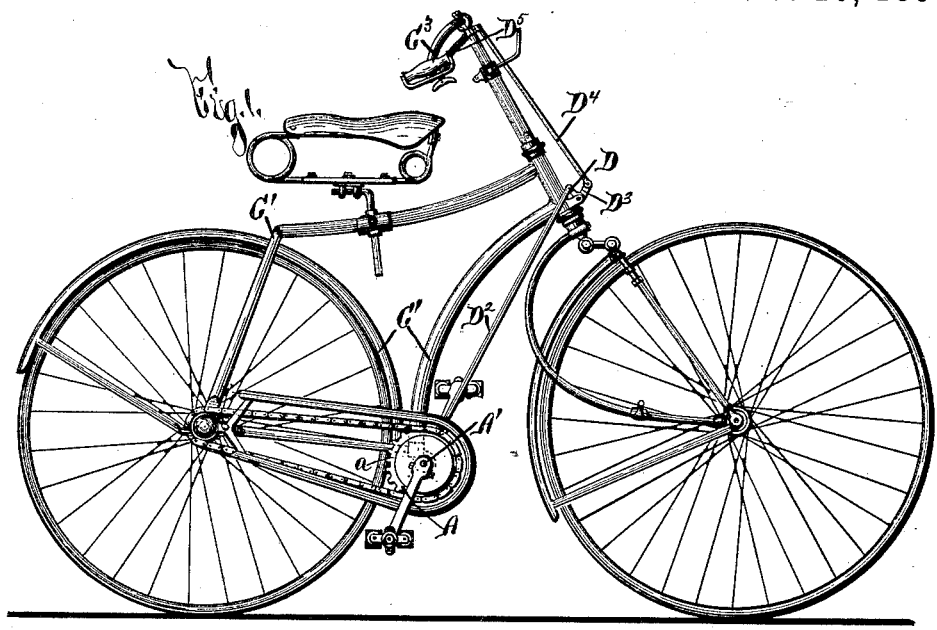
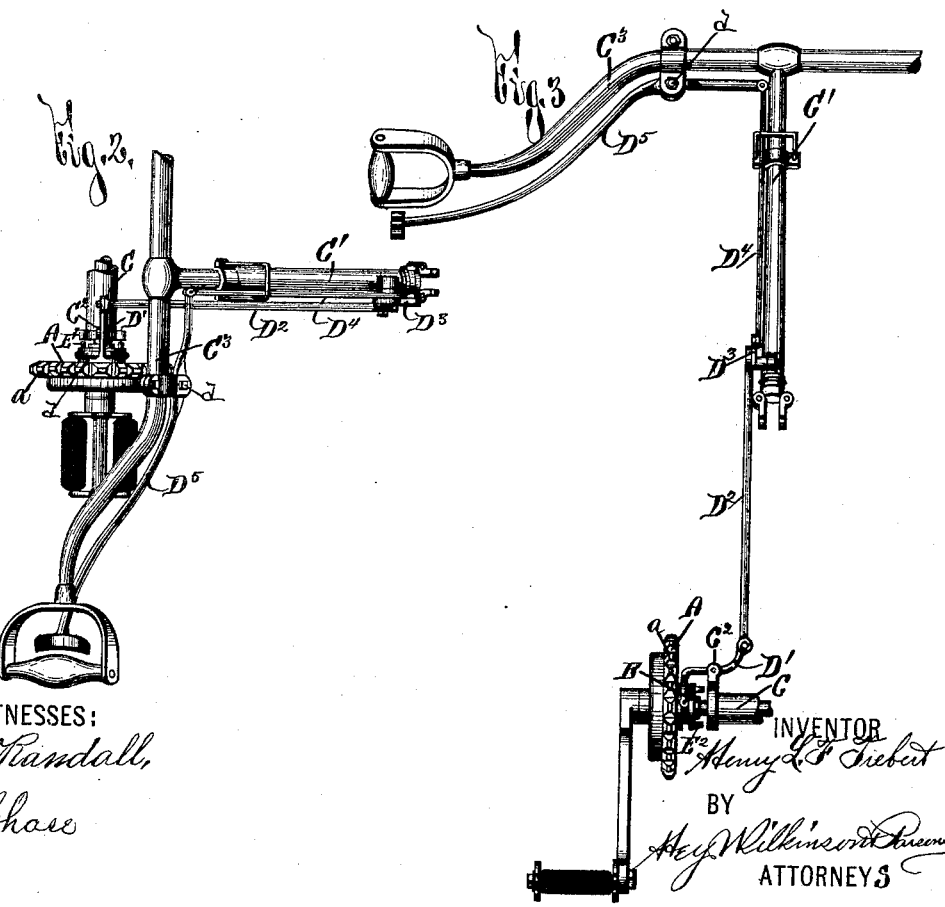
WITNESSES:
W. H. Randall,
H. E. Chase
INVENTOR
Henry L. F. Trebert
BY
H. J. Wilkinson & Queens
ATTORNEYS

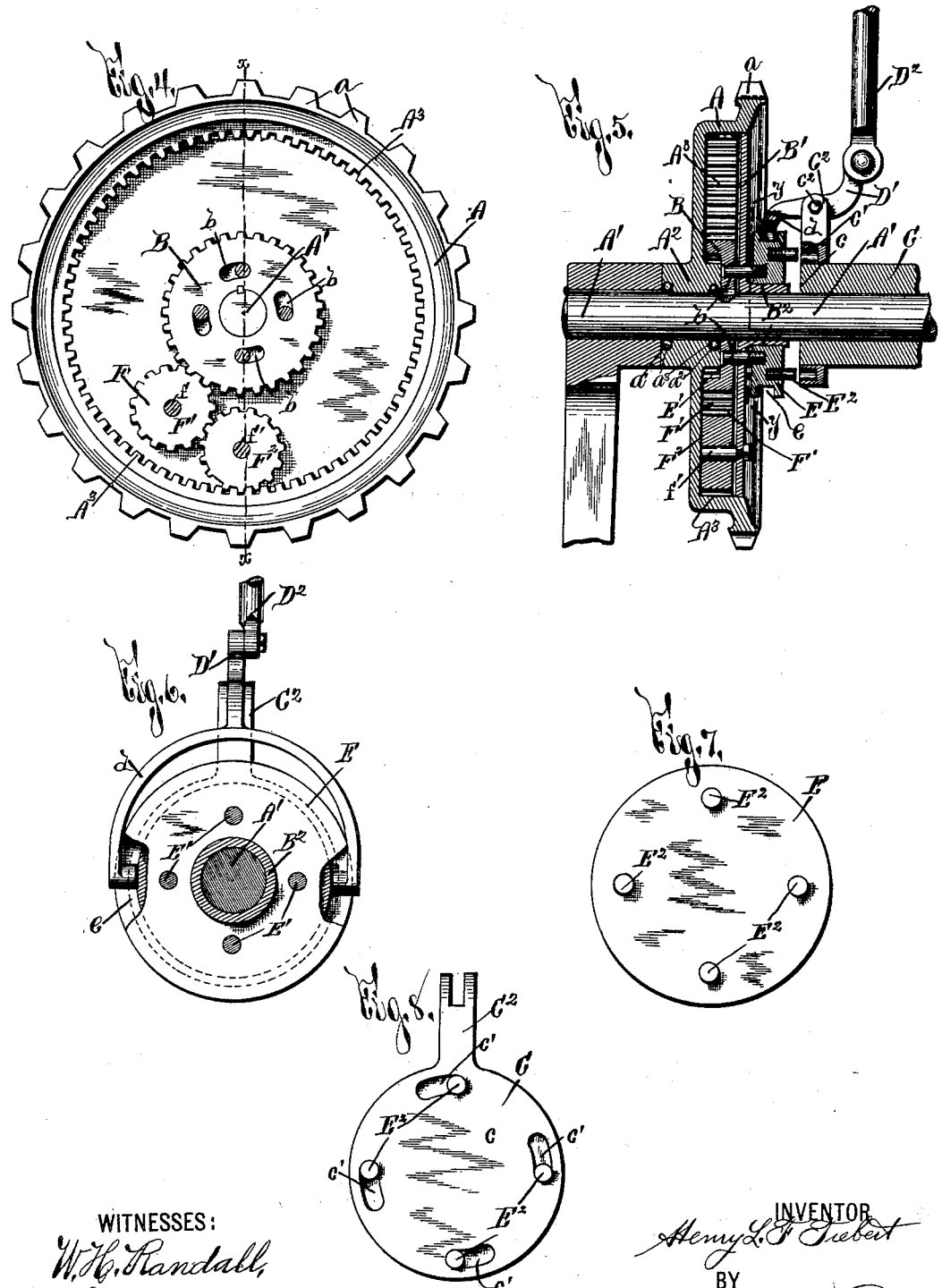

UNITED STATES PATENT OFFICE.

HENRY L. F. TREBERT, OF ROCHESTER, NEW YORK.

SPEED MECHANISM FOR BICYCLES.

SPECIFICATION forming part of Letters Patent No. 462,782, dated November 10, 1891.

Application filed January 5, 1891. Serial No. 376,697. (No model.)

*To all whom it may concern:*

Be it known that I, HENRY L. F. TREBERT, of Rochester, in the county of Monroe, in the State of New York, have invented new and useful Improvements in Differential-Speed Mechanism for Bicycles, of which the following, taken in connection with the accompanying drawings, is a full, clear, and exact description.

My invention relates to an improved differential-speed mechanism for bicycles and other like vehicles, and has for its object the production of a simple and effective device for readily changing the speed of the bicycle at the will of the rider; and to this end the invention consists, essentially, in a revoluble axle and wheel, a pair of mechanisms actuated by said axle to revolve the wheel with differential speed, and a shifter for throwing one of said mechanisms into and out of operation and preventing or permitting the operation of the other.

The invention furthermore consists in the detail, construction, and arrangement of the parts, all as hereinafter more particularly described, and pointed out in the claims.

In describing this invention, reference is had to the accompanying drawings, forming a part of this specification, in which like letters indicate corresponding parts in all the views.

Figure 1 represents an elevation of a bicycle having my improved differential-speed mechanism operatively arranged thereon. Figs. 2 and 3 are respectively top, plan, and front elevation of my improved differential-speed mechanism. Fig. 4 is a face view of the gearing connecting the axle and driving-wheel of the bicycle. Fig. 5 is a transverse vertical sectional view taken on line $xx$, Fig. 4. Fig. 6 is an enlarged sectional view taken on line $yy$, Fig. 5. Fig. 7 is a face view of the detached sliding clutch-section of the shifter, and Fig. 8 is a face view of the bracket for preventing the rotation of the clutch-section.

In the practical use of vehicles, and particularly bicycles, it is frequently both desirable and advisable to actuate the same with differential speed in proportion to the rotation of the pedals. For instance, when riding over asphalt and other hard and smooth surfaces a rider is able to actuate the pedals with greater ease than when passing over sandy or other yielding surfaces. It is thus evident that it would be very desirable to conform the speed of the bicycle to the condition of the road without varying the rotation of the pedals. This desirable result is effected by my invention, since, as presently described, by means of an actuator readily and easily operated the driving-wheel is caused to rotate either slowly or quickly, as may best suit the condition of the road or the will of the rider.

A represents a wheel, here shown as the ordinary driving or chain gear-wheel used in the well-known Safety bicycles. It is evident, however, that this wheel may be of desirable form and construction, and if the invention were applied to an ordinary bicycle A would represent the driving-wheel, and instead of being formed with teeth $a$, as now illustrated, it would be provided with spokes for supporting the felly and tire. The wheel A is loose upon the shaft $A'$, and, in order to reduce its friction to a minimum, is provided at the opposite extremities of its hub $A^2$ with the inner and outer annular recesses $a'$ and $a^2$, in which are mounted bearing-balls $a^3$.

B represents a gear locked upon the shaft $A'$ and adapted to actuate either the mechanism of slow or quick rotation.

$B'$ represents the speed mechanism of greater rotation, here illustrated as a disk loosely mounted on the shaft $A'$ and adapted to be either held from rotation, in which case the wheel A is slowly revolved, or to be locked with the gear B for quickly revolving the wheel A. The bracket or journal C for the axle $A'$ is supported by any suitable frame $C'$, the construction of which forms no material part of my invention. The outer face $c$ of the journal C is provided with apertures or slots $c'$, and in proximity to said face is the support $C^2$, to which is pivoted at $c^2$ a lever $D'$, forming a part of the shifter D. The lower extremity $d$ of the lever $D'$ is forked, as best shown in Fig. 6, and rides in a recess $e$, formed in the clutch-section E, loosely mounted on the hub $B^2$ of the disk $B'$. The outer face of this disk E is provided with pins $E'$, that project through the disk $B'$ into recesses $b$ in the gear B, and the inner face is provided with pins E², adapted to engage the apertures or recesses $c'$ in the journal C when the pins E' are out of engagement with the gear B. As best seen in Figs. 1, 2, and 3 of the drawings, the lever D' is pivoted at its upper extremity to a link D², the opposite end of which is pivoted to one arm of a bell-crank lever D³, and pivoted to the other arm of the lever D³ is a link D⁴, to which is hinged one end of a lever D⁵, pivoted at $d$, and arranged with its free extremity in proximity to the bicycle-handle C³, for permitting its ready engagement.

F represents the mechanism for slowly actuating the gear A, which, as here illustrated, consists of a pair of gears F' and F², journaled on spindles $f$ and $f'$ and upon the disk B', and adapted to engage the internal gear A³ of the wheel A. When the free end of the lever D' is in its normal position, as shown in the drawings, the pins E', secured to the clutch-section of the actuator, firmly lock together the disk B' and gear B, and thus prevent the rotation of the gears F and F². Consequently said gears, being prevented from rotation, form a rigid connection or lock between the disk B' and the interior gear A³ of the wheel A, and thus rotate said wheel with the same speed as the shaft A'. On the contrary, when the free end of said lever is drawn upward the lever D' is rocked, the pins E² engage the recesses $c'$, and the pins E' are withdrawn from engagement with the gear B, whereupon the disk B' is prevented from movement. It is therefore evident that as the gear B is rotated motion is transmitted by the gears F' F² to the internal gear A³, and the wheel A is revolved with less speed than would be the case were the disk B' locked to the gear B, as previously described.

To permit ready engagement of the pins E' and E² with their respective receiving-recesses without liability of cramping or injury to the parts, these recesses are preferably slightly elongated, as best seen in Figs. 4 and 8.

The operation of my invention will be readily perceived from the foregoing description and upon reference to the drawings, and it is evident that its construction is simple, its operation effective, and that it produces a very desirable result. It is evident, however, that my speed mechanism may be somewhat changed without departing from the spirit of my invention. Hence I do not limit myself to the precise detail, construction, and arrangement of the parts.

Having thus fully described my invention, what I claim as new, and desire to secure by Letters Patent, is—

1. A differential-speed mechanism for velocipedes, the same consisting of an axle, a driving-wheel, a pair of actuating mechanisms for rotating the driving-wheel, one of which is movable lengthwise of the axle into operative engagement with the driving-wheel, and a shifter for moving said movable actuating mechanism into operative engagement and preventing the operation of the other of said mechanisms, substantially as described.

2. In a differential-speed mechanism for velocipedes, the combination of a stationary part of the frame, an axle, a driving-wheel loosely revoluble on the axle and provided with an internal gear, a gear B, locked to the axle, a disk loose upon the axle, intermediary gears supported upon the disk and adapted to transmit motion from the gear B to the internal gear of the driving-wheel, and a lock for alternately engaging said loose disk with the stationary portion of the frame and with the gear B, substantially as and for the purpose set forth.

3. In a differential-speed mechanism for velocipedes, the combination of a stationary part of the frame, an axle, a driving-wheel loosely revoluble on the axle and provided with an internal gear, a gear B, locked to the axle, a disk loose upon the axle, intermediary gears supported upon the disk and adapted to transmit motion from the gear B to the internal gear of the driving-wheel, a lock movable lengthwise of the axle and adapted to alternately lock the loose disk to the stationary part of the frame and to the gear B, and a lever for moving said lock, substantially as and for the purpose set forth.

4. In a differential-speed mechanism for velocipedes, the combination of a stationary portion of the frame, an axle, a driving-wheel loosely revoluble on the axle and provided with an internal gear, a gear B, locked to the axle, a disk also loosely revoluble on the axle, intermediary gears mounted on the disk and adapted to transmit motion from the gear B to the internal gear of the driving-wheel, a disk E, sliding lengthwise of the axle, teeth on the inner face of said disk adapted to engage the stationary portion of the frame, and teeth on the outer face of the disk adapted to pierce the loosely-revoluble disk and engage the gear B, substantially as and for the purpose described.

5. In a differential-speed mechanism for velocipedes, the combination of a stationary portion of the frame, an axle, a driving-wheel loosely revoluble on the axle and provided with an internal gear, a gear B, locked to the axle, a disk also loosely revoluble on the axle, intermediary gears mounted on the disk and adapted to transmit motion from the gear B to the internal gear of the driving-wheel, a disk E, sliding lengthwise of the axle, teeth on the inner face of said disk adapted to engage the stationary portion of the frame, teeth on the outer face of the disk adapted to pierce the loosely-revoluble disk and engage the gear B, a lever D', having one end engaging said sliding disk E, a hand-lever D⁵, and connections between said hand-lever D⁵ and the lever D', substantially as and for the purpose specified.

6. In a differential-speed mechanism for velocipedes, the combination of a revoluble axle, a driving-wheel loosely mounted on the axle and provided with an internal gear, a gear B, locked to the axle, a disk loosely revoluble on the axle, intermediary gearing supported on said disk and adapted to transmit motion from the gear B to the internal gear, and a loose disk movable on the axle for preventing rotation of the loose disk carrying the intermediary gearing between the gear B and the internal gear of the driving-wheel, substantially as and for the purpose set forth.

7. In a differential-speed mechanism for velocipedes, the combination of a stationary portion of the frame having sockets in its outer face, a driving-wheel loosely revoluble on the axle and provided with an internal gear, a gear B, locked to the axle and provided with elongated recesses in its inner face, a disk B', loosely revoluble on the axle, intermediary gearing supported on the disk B' and adapted to transmit motion from the gear B to the internal gear, a sliding disk E, pins projecting from the outer face of said disk through apertures in the former disk and adapted to engage the elongated recesses in the gear B, and pins projecting from the inner face of said sliding disk and adapted to engage the sockets in the outer face of the stationary portion of the frame, substantially as and for the purpose set forth.

8. In a differential-speed mechanism for velocipedes, the combination of a revoluble axle, a driving-wheel loosely revoluble on the axle and provided with a substantially vertical outer side wall, an inwardly-extending peripheral wall and an internal gear, a gear B, locked to the revoluble axle and arranged within a perpendicular to the inner edge of the driving-wheel, a disk B', loosely mounted on the revoluble axle and arranged with its outer face within a perpendicular to the outer edge of the revoluble driving-wheel for preventing the entrance of dirt to the internal gear, intermediary gearing supported on the revoluble disk and adapted to transmit motion from the gear B to the internal gear, and a lock for preventing the revolution of the loosely-revoluble gear B', substantially as and for the purpose specified.

9. In a differential-speed mechanism for velocipedes, the combination of a stationary portion of the frame having sockets in its outer face, a driving-wheel loosely revoluble on the axle and provided with an internal gear, a gear B, locked to the axle and provided with elongated recesses in its inner face, a disk B', loosely revoluble on the axle, intermediary gearing supported on the disk B' and adapted to transmit motion from the gear B to the internal gear, a sliding disk E, pins projecting from the outer face of said disk through apertures in the former disk and adapted to engage the elongated recesses in the gear B, pins projecting from the inner face of said sliding disk and adapted to engage the sockets in the outer face of the stationary portion of the frame, a lever D', pivoted to said stationary portion of the bracket with one extremity engaging the sliding disk E, levers $D^3$ and $D^5$, and links between said levers D', $D^3$, and $D^5$, substantially as and for the purpose described.

10. In a differential-speed mechanism for velocipedes, the combination of a stationary portion of the frame having sockets in its outer face, a driving-wheel loosely revoluble on the axle and provided with an internal gear, a gear B, locked to the axle and provided with elongated recesses in its inner face, a disk B', loosely revoluble on the axle and provided with an inwardly-extending hub, intermediary gearing supported on the disk B' and adapted to transmit motion from the gear B to the internal gear, a sliding disk E, loosely revoluble on the projecting hub of the former disk, pins projecting from the outer face of said disk through apertures in the former disk and adapted to engage the elongated recesses in the gear B, and pins projecting from the inner face of said sliding disk and adapted to engage the sockets in the outer face of the stationary portion of the frame, substantially as and for the purpose described.

In testimony whereof I have hereunto signed my name, in the presence of two attesting witnesses, at Rochester, in the county of Monroe, in the State of New York, this 3d day of October, 1890.

HENRY L. F. TREBERT.

Witnesses:
L. M. BAXTER,
CHARLES P. LEE.